United States Patent
Sano

(10) Patent No.: US 8,118,007 B2
(45) Date of Patent: Feb. 21, 2012

(54) AIR INTAKE DEVICE FOR INTERNAL COMBUSTION ENGINE

(75) Inventor: Ryo Sano, Kariya (JP)

(73) Assignee: Denso Corporation, Kariya (JP)

( * ) Notice: Subject to any disclaimer, the term of this patent is extended or adjusted under 35 U.S.C. 154(b) by 184 days.

(21) Appl. No.: 12/754,806

(22) Filed: Apr. 6, 2010

(65) Prior Publication Data

US 2010/0251987 A1    Oct. 7, 2010

(30) Foreign Application Priority Data

Apr. 6, 2009  (JP) ................................ 2009-092280

(51) Int. Cl.
*F02D 41/00* (2006.01)
*F02M 35/10* (2006.01)
*F01L 7/00* (2006.01)
(52) U.S. Cl. ................. 123/306; 123/184.55; 123/190.1
(58) Field of Classification Search ................... 123/306, 123/336, 337, 184.55, 184.56, 190.1; 251/305
See application file for complete search history.

(56) References Cited

U.S. PATENT DOCUMENTS

| | | | |
|---|---|---|---|
| 6,979,130 B1 | 12/2005 | Stangier et al. | |
| 7,637,106 B2 * | 12/2009 | Hertweck et al. | 60/602 |
| 7,789,066 B2 * | 9/2010 | Torii et al. | 123/336 |
| 8,015,958 B2 * | 9/2011 | Vichinsky et al. | 123/184.55 |
| 2011/0107995 A1 * | 5/2011 | Takeda et al. | 123/184.56 |

FOREIGN PATENT DOCUMENTS

| | | |
|---|---|---|
| JP | 62-182447 | 8/1987 |
| JP | 63-309717 | 12/1988 |
| JP | 4-78874 | 12/1992 |
| JP | 10-047068 | 2/1998 |
| JP | 10-274062 | 10/1998 |
| JP | 11-013603 | 1/1999 |
| JP | 11-166466 | 6/1999 |
| JP | 2002-349725 | 12/2002 |
| JP | 2003-120346 | 4/2003 |
| JP | 2006-029469 | 2/2006 |
| JP | 2007-106708 | 4/2007 |
| JP | 2007-170340 | 7/2007 |
| JP | 2008-106708 | 5/2008 |
| JP | 2008-196408 | 8/2008 |
| JP | 2008-274785 | 11/2008 |

* cited by examiner

*Primary Examiner* — Hieu T Vo
(74) *Attorney, Agent, or Firm* — Nixon & Vanderhye PC

(57) ABSTRACT

An L-shaped rotary valve has a pair of side plates and a valve plate. The rotary valve is rotatably supported in a housing at a shaft 5. The valve plate moves along downstream ends of side wall portions of an air duct. A gap is formed between a downstream end of an air-intake passage and the valve plate, when the rotary valve is moved to its valve closed position. The side plates of the rotary valve cover the gap in a lateral direction in parallel to an axial direction of the shaft, so that leakage of air flow in the lateral direction of the gap is suppressed.

15 Claims, 11 Drawing Sheets

POSITIONING IN DUCT-LONGITUDINAL DIRECTION

AIR INTAKE DEVICE FOR INTERNAL COMBUSTION ENGINE

CROSS REFERENCE TO RELATED APPLICATION

This application is based on Japanese Patent Application No. 2009-092280 filed on Apr. 6, 2009, the disclosure of which is incorporated herein by reference.

FIELD OF THE INVENTION

The present invention relates to an air intake device for an internal combustion engine for controlling intake air to be supplied into combustion chambers of the engine.

BACKGROUND OF THE INVENTION

An air intake device is already known in the art, for example, as disclosed in Japanese Patent Examined Publication No. H04-078874, according to which a flow control valve is provided in an internal combustion engine for controlling an amount of intake air to be supplied into combustion chambers of the engine.

As shown FIGS. 11A and 11B of this application, a flow control valve has a housing 101, a rotary valve 103 movably and air-tightly supported in the housing 101 so that the rotary valve 103 rotates in a cylindrical portion 102 of the housing 101, a shaft 104 for supporting the rotary valve 103, and a driving unit 106 for driving to rotate the rotary valve 103 via the shaft 104.

The cylindrical portion 102 of the housing 101 has a cylindrical inner surface having a curvature radius at a center of the shaft 104. The cylindrical portion 102 has a first fluid port 111 and a second fluid port 112.

The rotary valve 103 has a pair of side plates 113 and an arc-shaped plate 114 connecting outer peripheries (that is, free ends) of the side plates 113 with each other. The arc-shaped plate 114 is formed in an arc shape having a curvature radius at the center of the shaft 104 so that an outer surface of the arc-shaped plate 114 air-tightly slides on the cylindrical inner surface of the cylindrical portion 102. An opening 115 is formed in the arc-shaped plate 114 of the rotary valve 103.

The flow control valve opens and/or closes the second fluid port 112 by rotation of the opening 115 and a wall portion 116 of the rotary valve 103, so that an opening area of the second fluid port 112 maybe continuously changed in accordance with a rotational angle of the rotary valve 103. As a result, an amount of intake air flowing through a valve accommodating room 117 is continuously controlled depending on the rotational angle of the rotary valve 103.

According to the above conventional flow control valve, the cylindrical portion 102 of the housing 101 is provided at the outer periphery of the rotary valve 103.

The above flow control valve may be applied to an engine, in which the flow control valve is provided in an air-intake passage 118 connected to a combustion chamber of the engine so that air flow of the intake air goes to one side of the air-intake passage, and thereby tumble flow is formed in the combustion chamber. The tumble flow is a swirl flow of the intake air in the combustion chamber, which flows in swirls in a vertical direction of the combustion chamber. In the case that the above flow control valve is used as such a tumble flow control valve (TCV) for the engine, there are some problems as below. When a gap formed between the outer peripheral surface of the arc-shaped plate 114 of the rotary valve 103 and the inner peripheral surface of the cylindrical portion 102 of the housing 101 becomes larger, air leakage amount would become larger in a valve closing condition of the rotary valve 103. In addition, since the intake air may diffuse from all of the outer peripheral portions of the arc-shaped plate 114 of the rotary valve 103, it may decrease a function required for the TCV, namely a function for moving the intake air to the one side of the air-intake passage 118.

On the other hand, when the gap between the outer peripheral surface of the arc-shaped plate 114 of the rotary valve 103 and the inner peripheral surface of the cylindrical portion 102 of the housing 101 becomes smaller, it may cause a problem in which a torque for driving the rotary valve 103 is increased, if combustion product (such as, combustion soot, adhesive material) contained in EGR gas or blow-by gas is deposited to the rotary valve 103 and/or the second fluid port 112. As a result, a problem of malfunction or a valve-lock of the rotary valve 103 may occur.

SUMMARY OF THE INVENTION

The present invention is made in view of the above problems. It is, therefore, an object of the present invention to provide an air intake device for an internal combustion engine, according to which it is not only possible to prevent intake air from diffusing from any outer peripheral portion of a valve but also possible to effectively move intake air to one side of an air-intake passage even in a case that a gap formed between a valve body of a rotary valve and a portion of the air-intake passage at a downstream side of the rotary valve is made to be large.

Furthermore, it is another object of the present invention to provide an air intake device for an internal combustion engine, according to which it is possible to suppress occurrence of a malfunction or a valve-lock of the rotary valve.

According to a feature of the present invention, an air intake device for an engine has a housing connected to an intake port of the engine and having an air-intake passage, a shaft rotatably supported by the housing, and a U-shaped rotary valve having connecting portions connected to the shaft and rotatable in the housing at the shaft for changing an opening area of the air-intake passage.

In the air intake device, the housing has an air duct forming therein the air-intake passage and extending from an upstream side to a downstream side of intake air flow through a space defined by the U-shaped rotary valve.

In the air intake device, the rotary valve has a pair of side plates extending outwardly from the connecting portion in a radial direction of the shaft, so that the side plates are opposed to each other in an axial direction of the shaft.

In the air intake device, the rotary valve further has a valve plate connected to each free end of the side plates, which is on an opposite side to the connecting portion.

In the air intake device, the valve plate faces to the downstream side of the air-intake passage in a direction of the intake air flow therein when the rotary valve is moved to its valve closed position, so that a gap is formed between the downstream side of the air-intake passage and the valve plate.

In the air intake device, at least one of the side plates covers the gap in a lateral direction in parallel to the axial direction of the shaft.

According to the above feature, the side plates of the rotary valve cover the gap in a lateral direction in parallel to an axial direction of the shaft, so that leakage of air flow in the lateral direction of the gap is suppressed, even in the case that the gap is designed to be larger.

In addition, since it is possible to make the gap formed between the downstream end of the air duct and the valve plate larger than the regular gap of the conventional device, it becomes possible to increase the allowable values for the deposit amount of the combustion product such as, combustion soot, adhesive material), which would be adhered to the rotary valve and/or the air-intake passages at the gap. As a result, the problem of malfunction and/or the valve-lock of the rotary valve can be avoided.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Embodiments of the present invention will be explained with reference to the drawings.

First Embodiment

Figure 1A:
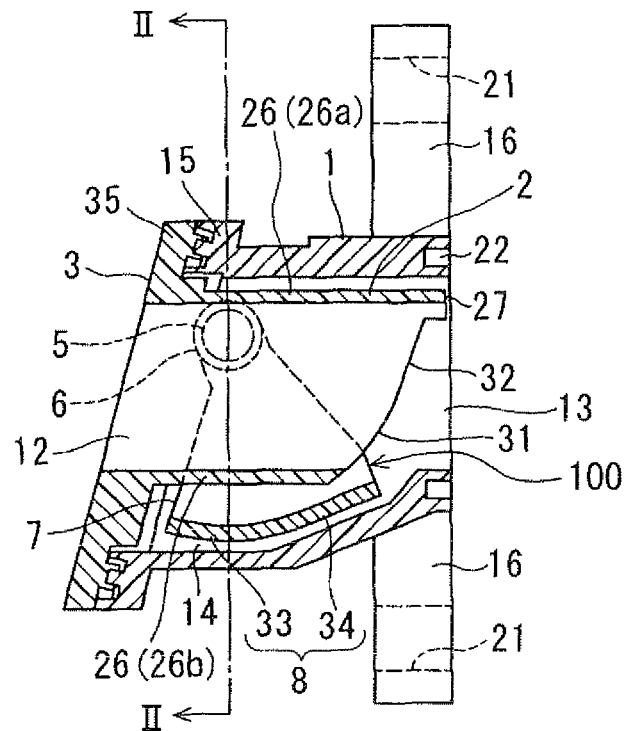
FIGS. 1A and 1B are schematic cross sectional views showing a rotary valve according to a first embodiment of the present invention.
Figure 1B:
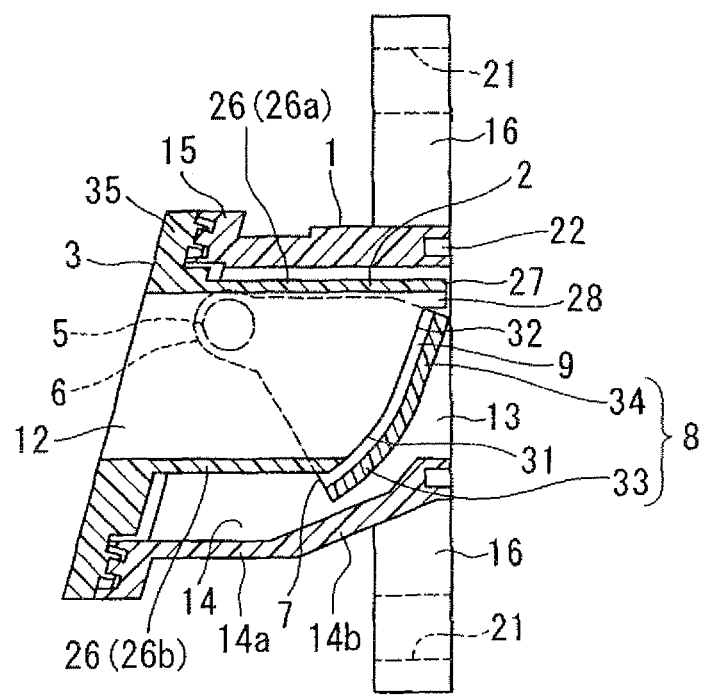
Figure 2:
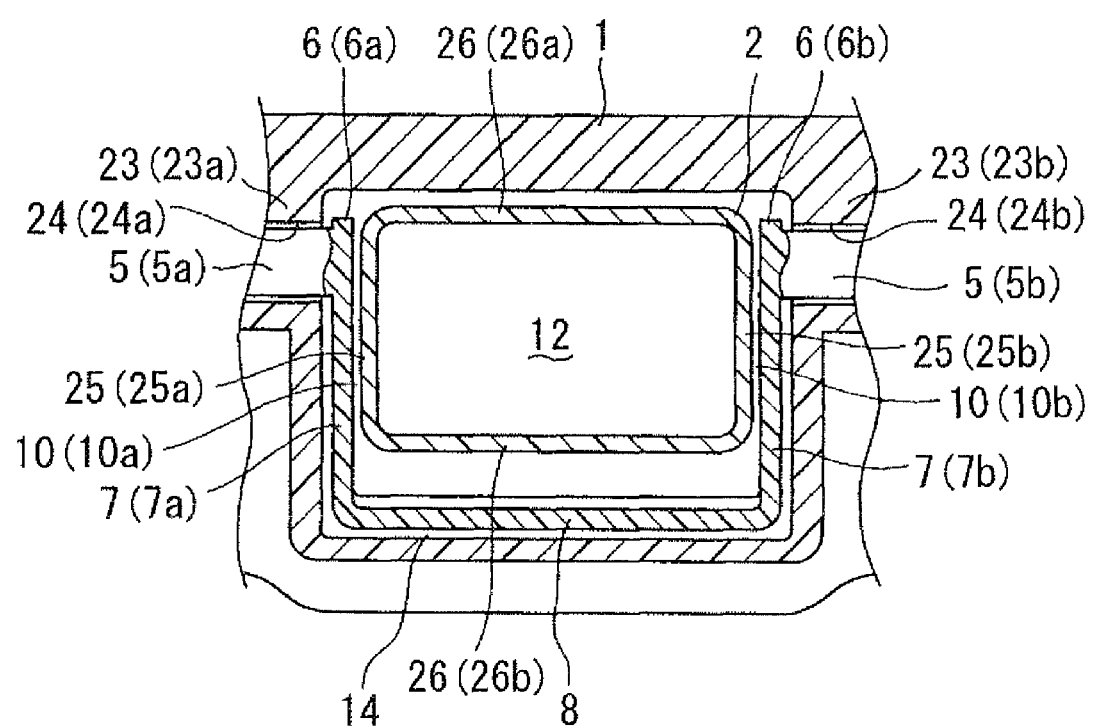
FIG. 2 is a schematic cross sectional view taken along a line II-II in FIG. 1A.

FIGS. 1A, 1B and 2 show a first embodiment of the present invention. FIG. 1A shows a valve condition of a rotary valve, which is accommodated in an accommodating space (that is, a valve opening condition). FIG. 1B shows a valve condition, according to which the rotary valve closes an air-intake passage (that is, a valve closing condition). FIG. 2 is a cross sectional view showing a valve unit, in which an air duct is provided inside of the rotary valve.

According to the present embodiment, an air intake device for an internal combustion engine having a plurality of cylinders has a plurality of valve units, each of which is accommodated within an air-intake pipe (air-intake duct) of the engine and used as an air-flow control valve (a tumble flow control valve). The valve unit is composed of a housing (having a valve block 1, multiple air ducts 2, and multiple valve covers 3) connected to a cylinder head (not shown) of the engine, a shaft 5 (for example, made of resin) rotatably supported by the housing (in particular, by the valve block 1), and U-shaped rotary valves 100 made of resin. Each of the rotary valves 100 has a pair of connecting portions 6, a pair of side plates 7 (7a, 7b) and a valve plate 8.

The air intake device is an integrated multiple valve device for opening and/or closing an air-intake passage, according to which a plurality of valve sub-units are arranged in the valve block 1 at an equal interval in a line in parallel to an axial direction of the shaft 5 (a direction of a rotational axis of the shaft 5). Each of the valve sub-units is composed of the air duct 2, the valve cover 3, and the rotary valve 100.

The engine (not shown) has multiple cylinders (first to fourth cylinders), namely a cylinder block having the first to fourth cylinders arranged in a line and a cylinder head having multiple intake ports and exhaust ports.

A poppet type intake valve (not shown) is provided in each of the intake ports respectively connected to each of combustion chambers of the engine, so that the intake port is opened and/or closed by the intake valve. In a similar manner, a poppet type exhaust valve (not shown) is provided in each of the exhaust ports respectively connected to each of the combustion chambers of the engine, so that the exhaust port is opened and/or closed by the exhaust valve.

The cylinder head (not shown) has a connecting surface, to which the housing (the valve block 1, the air ducts 2, and the valve covers 3) is fixed by fixing bolts. Multiple spark plugs (not shown) are mounted in the cylinder head, so that a forward end of each spark plug is exposed into each of the combustion chambers of the engine. Furthermore, multiple fuel injectors (not shown; electromagnetic fuel injection valves) are mounted in the cylinder head in order to inject fuel into the respective intake ports at most appropriate injection timings.

An intake pipe (not shown) is connected to the cylinder head in order to supply the intake air into the respective combustion chambers of the engine, and an exhaust pipe (not shown) is likewise connected to the cylinder head so as to discharge exhaust gas from the respective combustion chambers to the atmosphere through an exhaust gas purifying apparatus (not shown).

An air-intake passage is formed in the intake pipe so that cleaned air by an air cleaner (not shown) is supplied into the respective combustion chambers via a throttle body (not shown) of an electronically controlled throttle device (not shown), a surge tank (not shown), an intake manifold (not shown), and the housing (the valve block 1, the air duct 2 and the valve cover 3). Therefore, although not shown in the drawings, an air cleaner casing, an air cleaner hose, the throttle body, the surge tank, the intake manifold, and the housing are respectively provided (connected) to the intake pipe.

The four combustion chambers are formed in the cylinder block of the engine in a cylinder-arranged line. In each of cylinder bores (which is formed in the cylinder block), a piston is movably accommodated in a reciprocating manner, wherein the piston is connected to a crank shaft via a connecting rod.

The valve unit is arranged in an engine room of a vehicle (such as a motor vehicle) and constitutes a swirl flow generating device (also referred to as an air flow control valve, or a tumble flow control valve: TCV), which generates the tumble flow (that is, the swirl flow of the intake air) in the respective combustion chambers of each cylinder in the vertical direction thereof by restricting a passage area of the air-intake passages 12 and 13 connected to the respective combustion chambers of the engine. The valve unit is incorporated into an intake system of the engine together with the electronically controlled throttle device having the throttle valve in the throttle body.

The valve unit has a plurality of the air-intake passages 12 respectively connected to the plurality of intake ports formed in the cylinder head. The air-intake passage 12 is a passage portion formed inside of the air duct 2 of the housing. Each of the air-intake passages 12 has an air-inlet portion at an upstream end and an air-outlet portion at a downstream end thereof. The air-intake passages 12 form an air-inlet portion of the housing.

The housing (1, 2, and 3) is interposed between a downstream end surface of the intake manifold (not shown) and an upstream end surface of the cylinder head (not shown). The housing is composed of the valve block 1 made of resin, the air duct 2 made of the resin and inserted into and held in the inside of the valve block 1, and the valve cover 3 made of the resin and fixing an upstream end of the air duct 2 to an upstream end of the valve block 1 and covering the upstream end of the air duct 2.

A plurality of the air-intake passages 13 are formed in the inside of the valve block 1, so that each of the air-intake passages 13 is communicated to the respective air-intake passages 12 formed in the air ducts 2. Each of the air-intake passages 13 is arranged at a downstream side of the respective air-outlet portions of the air-intake passages 12. Each of the air-intake passages 13 is respectively communicated to each of the combustion chambers via the intake ports of the cylinder head. The air-intake passages 13 form an air-outlet portion of the housing.

The valve block 1 is made of the resin, integrally formed in one unit, and has a plurality of inside spaces (the number of the inside spaces corresponds to that of the cylinders). The valve block 1 is a partitioning wall member formed at outer peripheries of the respective air ducts 2, so as to surround each of the air ducts 2 in a circumferential direction. In other words, the valve block 1 defines the plurality of the inside spaces and separates those inside spaces from the outside area. As shown in FIG. 2, the valve block 1 has the inside spaces, each of which is formed at an outer peripheral side of the air duct 2 and has a square shaped cross section. Each of the side plates 7 (7a, 7b) is movably accommodated in respective spaces formed between an inner side wall of the square-shaped inside space of the valve block 1 and the air duct 2 in an axial direction of the shaft 5 (at outer sides of the air duct 2), so that the rotary valve 100 is movably accommodated in the square-shaped inside space in its rotational direction.

A valve accommodating space 14 is formed in a part of the square-shaped inside space of the valve block 1, that is, at a lower portion thereof in a vehicle up-down direction (i.e. an up-down direction in the drawings; a direction of gravity), so that the valve plate 8 of the rotary valve 100 is accommodated in the valve accommodating space 14 in the valve opening condition. More specifically, the valve accommodating space 14 is formed between a lower wall portion 26b of the air duct 2 and a bottom surface portion (14a and 14b) of the square-shaped inside space of the valve block 1. The valve accommodating space 14 is opened to the air-intake passage 13 at a portion adjacent to the air outlet portion of the air-intake passage 12 formed by the air duct 2 (that is, the downstream side thereof). A downstream half portion 14b of the bottom surface portion is inclined toward the air-intake passage 13, so that a cross sectional area of the valve accommodating space 14 at the opening portion (at the downstream half portion 14b) is smaller than that at an upstream half portion 14a of the bottom surface portion for the valve accommodating space 14.

A flanged portion 15 is formed at an upstream end of the valve block 1, to which the valve cover 3 is attached. The flanged portion 15 has a connecting surface to be air-tightly connected to a connecting surface of the valve cover 3. The connecting surface of the flanged portion 15 is inclined with respect to a plane perpendicular to a flow direction of the intake air flowing through the air-intake passage 12.

A plurality of fixing stays 16 is formed at the downstream side of the valve block 1, so that the valve block 1 is fixed to the cylinder head.

Figure 3:
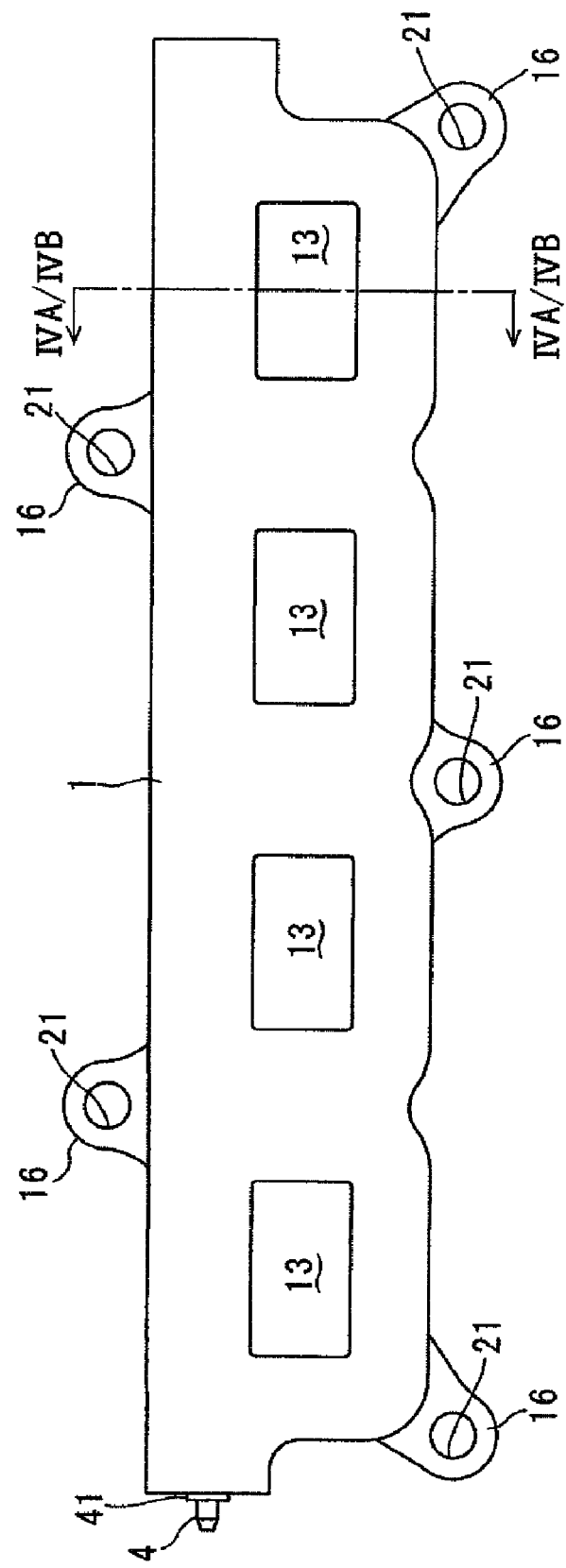
FIG. 3 is a schematic front view showing a rotary valve according to a second embodiment of the present invention.

The fixing stays 16 are formed of upper side fixing flanges (for example, two flanges) which are projecting in an upper direction of the vehicle and lower side fixing flanges (for example, three flanges) which are projecting in a lower direction, for example, as shown in FIG. 3 (although it shows a second embodiment). The valve block 1 and the fixing stays 16 have a connecting surface to be air-tightly connected to a connecting surface of the cylinder head, wherein the connecting surface is formed as a flat surface extending in a plane perpendicular to the flow direction of the intake air flowing through the air-intake passages 12 and 13.

A through-hole 21 is formed in each of the fixing stays 16, through which a fixing bolt is inserted. The through-holes 21 and screw holes formed in the cylinder head are coaxially arranged.

A plurality of square-shaped grooves 22 is formed at the connecting surface of the valve block 1, each of which surrounds an open end of the air-intake passage 13. A plurality of gaskets (not shown) are inserted into the respective grooves 22, so as to seal gaps between the connecting surface of the valve block 1 and the connecting surface of the cylinder head.

The valve block 1 has a plurality of wall portions 23 formed between the adjacent inside spaces and through-holes 24 are formed in each of the wall portions 23 for rotatably supporting shaft portions 5a and 5b of the shaft 5.

An actuator (not shown) is provided to the valve block 1 for driving the shaft 5 (5a, 5b) and then the rotary valves 100 connected to the shaft 5 (5a, 5b) to open and close the respective air-intake passages 12 and 13. The actuator is composed of an electric motor for generating a driving power upon receiving electric power and a power transmitting device (for example, a reduction gear device) for transmitting the driving power of the electric motor to the shaft 5.

The air duct 2 is made of the resin and integrally formed with the valve cover 3. The air duct 2 as well as the valve cover 3 is formed as a separate member from the valve block 1. The air duct 2 is formed as a wall surrounding the air-intake passage 12 and has a square-shaped cross section. The air duct 2 is arranged inside of the rotary valve 100 (that is a space defined by the connecting portions 6, the side plates 7 and the valve plate 8). The air duct 2 is formed of a pair of side wall portions 25 (right-hand side and left-hand side wall portions 25a and 25b), an upper wall portion 26a and the lower wall portion 26b.

The air duct 2 has open ends at the air inlet portion and the air outlet portion (at the upstream and downstream sides of the air-intake passage 12) and straightly extends from the air inlet portion to the air outlet portion through the inside of the rotary valve 100 (the space defined by the connecting portions 6, the side plates 7 and the valve plate 8).

The valve cover 3 is integrally formed with the air duct 2 at the upstream side of the air-intake passage 12.

A duct extending portion 27 is formed as an integral portion of the air duct 2 at the downstream side of the air-intake passage 12. The duct extending portion 27 is formed in a window-roof shape, so that a cross section has a small U-shaped configuration (a height of a side portion is small). A space defined by and between the duct extending portion 27 and the valve plate 8 (when it is moved to the valve closed position) forms a communication passage 28. The duct extending portion 27 may be so formed that the duct extending portion is also used as a stopper for the rotary valve 100, so as to define a stopping position of the rotary valve 100 for its fully closed condition.

As shown in FIGS. 1A and 1B, each of the downstream ends of the side wall portions 25 (25a, 25b) of the air duct 2 is formed with a curved portion 31 and a straight portion 32. The curved portion 31 is an arc shaped end having a curvature radius at a center of the shaft 5. The straight portion 32 is another end portion smoothly extending from the curved portion 31, wherein the straight portion is inclined with respect to a direction perpendicular to the flow direction of the intake air in the air-intake passage 12.

The curved portion 31 is formed at a lower half of the side wall portion 25 (25a, 25b) of the air duct 2, while the straight portion 32 is formed at an upper half thereof. The curved portion 31 faces to a curved surface portion 33 of the valve plate 8 (of the rotary valve 100), when the rotary valve 100 is moved to its fully closed position, as shown in FIG. 1B. A gap 9 is formed between the curved portion 31 and the curved surface portion 33 and the gap 9 is so designed that it has a clearance larger than that of the convention device by a predetermined value (for example, 0.1 to 0.3 mm).

The straight portion 32 formed in the side wall portion 25 (25a, 25b) faces to a flat surface portion 34 of the valve plate 8, when the rotary valve 100 is in the valve closed condition. The gap 9 formed between the straight portion 32 and the flat surface portion 34 is likewise so designed to have a clearance (for example, 0.1 to 0.3 mm) larger than that of the convention device.

The valve cover 3 is integrally formed with the air duct 2 and has a connecting portion 35, which is connected to the flanged portion 15 of the valve block 1.

The rotary valve 100 is movably accommodated in the inside space of the valve block 1. The rotary valve 100 is the air flow control valve (swinging at the shaft 5) having the U-shaped cross section for generating the vertical swirling flow in the combustion chamber of the respective cylinders. The rotary valve 100 is made of the resin to have a desired shape.

As shown in FIG. 1A, the rotary valve 100 is moved to its fully opened position by the actuator (not shown) during a normal operating condition of the engine. In the valve opened condition, the rotary valve 100 (in particular, the valve plate 8) is accommodated in the valve accommodating space 14, so that the air-intake passage 12 is fully opened. The rotary valve 100 may be biased by a spring (not shown) provided in the actuator in a direction to the valve opening position.

As shown in FIG. 1B, the rotary valve 100 is moved to its fully closed position by the actuator at starting the engine and during an idling operation of the engine. In the valve closed condition, the rotary valve 100 is moved out of the valve accommodating space 14, so that the air-intake passage 12 is fully closed. The rotary valve 100 may alternatively be biased by a spring (not shown) provided in the actuator in a direction to the valve closing position.

In the case that the rotary valve 100 is biased by the spring in the valve opening direction, the rotary valve is moved to the valve fully opened position (or any intermediate valve opening position) by the spring force, when the power supply to the actuator is cut off.

A rotational angle of the rotary valve 100 (that is, an opening degree of the rotary valve) is continuously changed within a full valve operating range, that is between the valve fully opened condition and the valve fully closed condition. As a result, the air-intake passage 12 formed in the air duct 2 is changed from its opened condition to its closed condition. Namely, an opening area of the air-intake passage 12 is controlled depending on the rotational position of the rotary valve 100.

In the present invention, the rotary valve 100 is operated as a two-position valve having the fully opened and fully-closed valve positions.

The shaft 5 is made of the resin and integrally formed with the rotary valve 100 (including the side plates 7 and the valve plate 8). The shaft 5 is composed of a first shaft portion 5a extending in a leftward direction in FIG. 2 from the left-hand side connecting portion 6 and a second shaft portion 5b extending in a rightward direction in FIG. 2 from the right-hand side connecting portion 6.

The first shaft portion 5a is rotatably supported by the through-hole 24a formed in the left-hand side wall portion 23a, while the second shaft portion 5b is likewise rotatably supported by the through-hole 24b formed in the right-hand side wall portion 23b.

The first and second shaft portions 5a and 5b are coaxially arranged, so that a virtual rotational axis between the first and second shaft portions 5a and 5b extends through an inside of the air-intake passage 12 formed in the air duct 2. The rotational axis of the shaft 5 extends in a horizontal line of the vehicle.

Although only one rotary valve 100 is shown in FIG. 2, the first and second shaft portions 5a and 5b are respectively and integrally connected to shaft portions of the neighboring rotary valves. The actuator (including the electric motor, the reduction gear device, etc) may be connected to one end of first or second shaft portion 5a or 5b.

The electric motor of the actuator is electrically connected to a battery (not shown) mounted in the vehicle, via an electric driving circuit controlled by the engine control unit (ECU).

The connecting portions 6a and 6b are made of the resin, so that the connecting portions 6a and 6b are integrally connecting the first and second shaft portions 5a and 5b with the side plates 7 (7a, 7b). The shaft 5 (the shaft portions 5a and 5b) and the connecting portions 6a and 6b are arranged in the wail portions 23a and 23b at such a position, which is relatively at an upstream side of the air-intake passage 12 (the air duct 2).

The side plates 7 (7a, 7b) are opposing to each other in a direction in parallel to the rotational axis of the shaft 5. Each of the side plates 8 (7a, 7b) has a fan-shaped plate portion outwardly extending in a radial direction from the respective connecting portions 6 (6a, 6b) to a free end portion.

Each of the side plates 7 (7a, 7b) is accommodated in the space defined between the inner surface of the inside space of the valve block 1 and the side wall portion 25 (25a, 25b), when the rotary valve 100 is moved from the valve opened position to the valve closed position or vice versa. Each of the side plates 8 (7a, 7b) faces to the respective side wall portions 25 (25a, 25b) at side gaps 10 (10a and 10b).

The valve plate 8 is formed by the curved surface portion 33 and the flat surface portion 34, which are bent at the free end portions of the side plates 7 (7a, 7b) at right angle thereto.

The valve plate 8 extends from one of the side plates 7 to the other side plate 7 in a direction in parallel to the rotational axis of the shaft 5.

Each of the side plates 7 (7a, 7b) is shown in FIGS. 1A and 1B as having the fan-shape. However, the shape of the side plates 7 (7a, 7b) should not be limited to such fan-shape, but may be formed in a T-shaped configuration. Each of the T-shaped side plates has a side wall portion at each side of the valve plate 8, wherein the side wall portion may extend from the valve plate 8 toward the connecting portion 6 and a height of such side wall portion may be sufficient when it is twice larger than a distance of the gap 9. According to such a modified configuration, the open end at the downstream side of the air-intake passage 12 is covered by the rotary valve, as in the same manner to the embodiment shown in FIGS. 1A and 1B. In other words, the gaps 9 are formed between both side wall portions 25 (25a, 25b) and the valve plate 8 when the rotary valve 100 is moved to the valve closed position, as shown in FIG. 1B, and such gaps 9 at both side wall portions 25 (25a, 25b) are also covered by the above modified rotary valve 100.

The valve plate 8 swings in a forward or backward direction around the rotational axis of the shaft 5 in the inside space of the valve block 1 at the downstream side of the air-intake passage 12, so that the opening area of the air-intake passage 12 is changed depending on the valve position (the position of the valve plate 8). In the valve closed condition, as shown in FIG. 1B, the valve plate 8 faces to the air outlet portion of the air-intake passage 12 via the gap 9. Accordingly, the opening area of air-intake passage 12 is changed depending on an area, in which the valve plate 8 and the air outlet portion of the air-intake passage 12 are overlapping each other.

The curved surface portion 33 of the valve plate 8 faces to the curved portions 31 of the side wall portions 25 (25a, 25b). The curved surface portion 33 has an arc-shaped recessed surface having a curvature radius with a center at the shaft 5. The flat surface portion 34 smoothly extends from the curved surface portion 33.

The flat surface portion 34 is inclined with respect to the direction perpendicular to the flow direction of the intake air in the air-intake passage 12, when the rotary valve 100 is moved to its fully closed position, as shown in FIG. 1B.

The forward end of the flat surface portion 34 of the valve plate 8 forms the communication passage 28 at the downstream end of the air-intake passage 12 together with the duct extending portion 27, when the rotary valve 100 is moved to the valve closed position.

The communication passage 28 is formed by restricting the area of the air-intake passage 12 so that the opening area of the communication passage 28 becomes smaller than a predetermined value, in order to generate the swirl flow (the tumble flow) in the combustion chamber of the engine. When the opening area of the communication passage 28 is made smaller, it is possible to make stronger the swirl flow (the tumble flow) to be generated in the combustion chamber.

The forward end of the flat surface portion 34 of the valve plate 8 may be formed as a stopper for the rotary valve 100, so that the forward end may abut on the duct extending portion 27 to define a stopping position of the rotary valve 100 for the valve closed condition.

An operation of the air intake device for the engine, in particular, an operation of the valve unit will be explained with reference to FIGS. 1A, 1B and 2.

When an ignition switch (not shown) is turned on, the ECU starts an operation for an electric motor of the electronic throttle device, an ignition device (including an ignition coil and spark plugs), a fuel injection device (a fuel pump, fuel injectors, etc), so that an engine operation is started. When a piston (not shown) of the respective cylinders moves downwardly in an intake stroke, an intake valve is opened so that air-fuel mixture will be sucked into the combustion chamber.

During a starting operation or an idling operation of the engine, in which engine temperature is low and intake air amount is relatively small, the ECU controls the electric motor of the actuator for the air intake device, which is connected to the shaft 5, for driving to move the rotary valves 100 for the respective cylinders to the valve closed positions. The multiple rotary valves 100 are driven by the shaft 5 at the same time. Namely, the valve plate 8 of the rotary valve 100 is moved to the valve closed position shown in FIG. 1B, in which the valve plate 8 faces to the air outlet portion of the air-intake passage 12 via the gap 9.

In the valve closed condition, the intake air flows in the air-intake passage 12 along the curved surface portion 33 and the flat surface portion 34 of the valve plate 8, and then passes through the communication passage (the restricted passage) 28 formed between the duct extending portion 27 and the forward end of the valve plate 8. The intake air flows into the air-intake passage 13 and then flows in the intake port formed in the cylinder head along an upper wall thereof. The intake air flowing along the upper wall is sucked into the combustion chamber via the opened intake valve to generate the swirl flow (the tumble flow) in the combustion chamber. As a result, combustion efficiency is improved during the starting operation and/or idling operation of the engine, to thereby improve fuel consumption ratio and emission (for example, reduction of HC)

On the other hand, during the normal operation of the engine, in which the engine temperature is enough high and the intake air amount is relatively high, the ECU controls the electric motor of the actuator for driving the rotary valves 100 to the valve opened positions. Namely, the valve plate 8 of the rotary valve 100 is moved to the valve opened position shown in FIG. 1A, in which the valve plate 8 is accommodated in the valve accommodating space 14.

In the valve opened condition, the intake air straightly flows in the air-intake passages 12 and 13 and the intake port formed in the cylinder. The intake air is sucked into the combustion chamber without generating the tumble flow therein.

As above, the valve accommodating space 14 is formed at the outer side of the air-intake passages 12 and 13 (at the lower side of the passages 12 and 13). The valve plate 8 of the rotary valve 100 is accommodated in the valve accommodating space 14 when the rotary valve 100 is moved to the valve opened position. The air duct 2 forming the air-intake passage 12 is arranged in the inside of the rotary valve 100 (that is, the space defined by the connecting portions 6, the side plates 7 and the valve plate 8). In other words, the rotary valve 100 is arranged at the outer side of the air-intake passages 12 and 13 formed in the housing (the air duct 2).

According to such a structure, the intake air can straightly flow through the intake-air passages 12 and 13 without being disturbed by the rotary valve 100 (the side plates 7 and the valve plate 8), even when the rotary valve 100 is moved to the valve opened position. As a result, the air resistance for the intake air passing through the air-intake passages 12 and 13 can be reduced.

In the valve closed position (FIG. 1B), the gap 9 is formed at the downstream end of the air-intake passage 12, namely between the curved and flat surface portions 33 and 34 of the side wall portions 25 (25a, 25b) of the air duct 2 and the valve plate 8. However, in the valve closed position, the side plates 7 (7a, 7b) cover lateral openings of the gap 9 in the horizontal direction, so that the side plates 7 (7a, 7b) prevent the intake air from leaking through the gap 9 in the horizontal direction.

The duct extending portion 27 of the window-roof shape, which is formed at the downstream end of the side wall portions 25 (25a, 25b) and the upper wall portion 26a, extends in the downstream direction of the intake air flow beyond the gap 9 formed between the side wall portions 25 (25a, 25b) and the valve plate 8. Therefore, the duct extending portion 27 prevents the intake air not only from flowing in the lateral direction (in the horizontal direction in a plane perpendicular to the intake air flow) but also from flowing in an upward direction. As above, the duct extending portion 27 prevents diffusion of the intake air around the rotary valve 100 (the valve plate 8) when the rotary valve 100 is moved to the valve closed position.

Since the side plates 7 (7a, 7b) are provided to the rotary valve 100 and the duct extending portion 27 is provided at the downstream end of the air duct 2, the diffusion of the intake air (the leakage of the air) from all of the circumferential portions of the valve plate 8 can be suppressed, even when the gap 9 is made larger.

In addition, the intake air possibly leaking through the side gaps 10 (10a, 10b) formed between the side wall portions 25 (25a, 25b) and the side plates 7 (7a, 7b) can be also suppressed to a smaller amount. As a result that the possible leakage of the intake air through the gap 9 and/or the side gaps 10 (10a, 10b) can be effectively suppressed to the smaller amount, the intake air can be collected at the communication passage 28. Therefore, the intake air is effectively moved to the one side (the upper wall portion) of the intake port connected to the combustion chamber.

According to the first embodiment, the valve plate 8 has the curved surface portion 33 and the flat surface portion 34, which is inclined with respect to the plane perpendicular to the intake air flow in the valve closed condition, so that the intake air can be effectively collected toward the communication passage 28. Accordingly, it is possible to effectively move the intake air to the one side (i.e. the upper wall portion) of the intake port to thereby generate stronger swirl flow (the tumble flow) in the combustion chamber.

According to the present embodiment, it is possible to make the gap 9 formed between the downstream end of the air duct 2 and the valve plate 8 larger than the regular gap of the conventional device by more than a predetermined amount (for example, 0.1 to 0.3 mm). As a result, it becomes possible to increase the allowable values for the deposit amount of the combustion product (such as, combustion soot, adhesive material), which would be adhered to the rotary valve 100 and/or the air-intake passages 12 and 13 at the gap 9 and the side gaps 10 (10a, 10b). Since the downstream end of the air duct 2 and the valve plate 8 are not likely to become dirty, it is possible to suppress increase of the driving torque for the rotary valve 100. As a result, the problem of malfunction and/or the valve-lock of the rotary valve can be avoided.

Second Embodiment

Figure 4A:
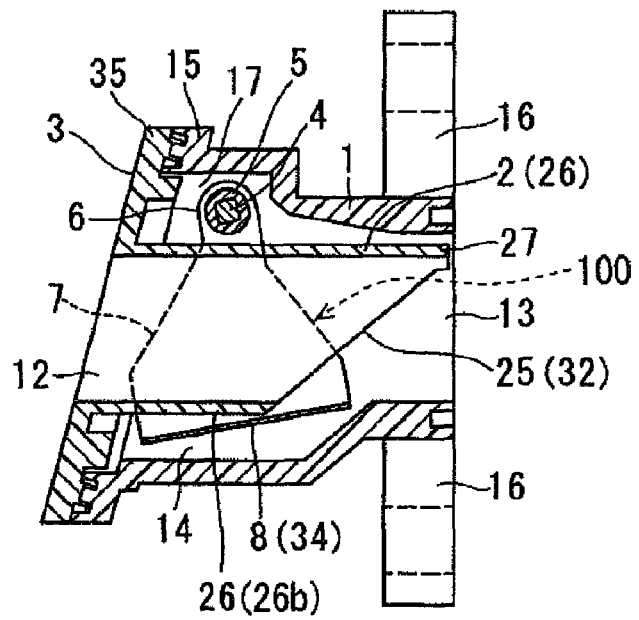
FIGS. 4A and 4B are schematic cross sectional views showing the rotary valve according to the second embodiment of the present invention, and taken along a line IVA/IVB-IVA/IVB in FIG. 3.
Figure 4B:
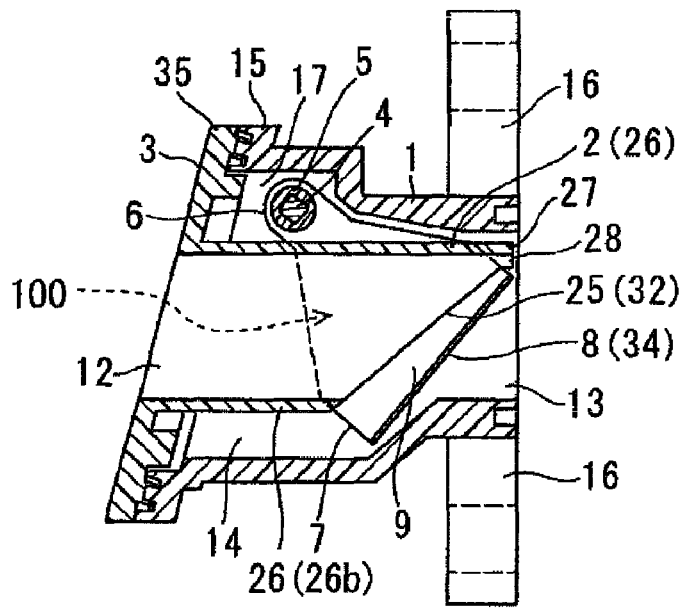
Figure 5:
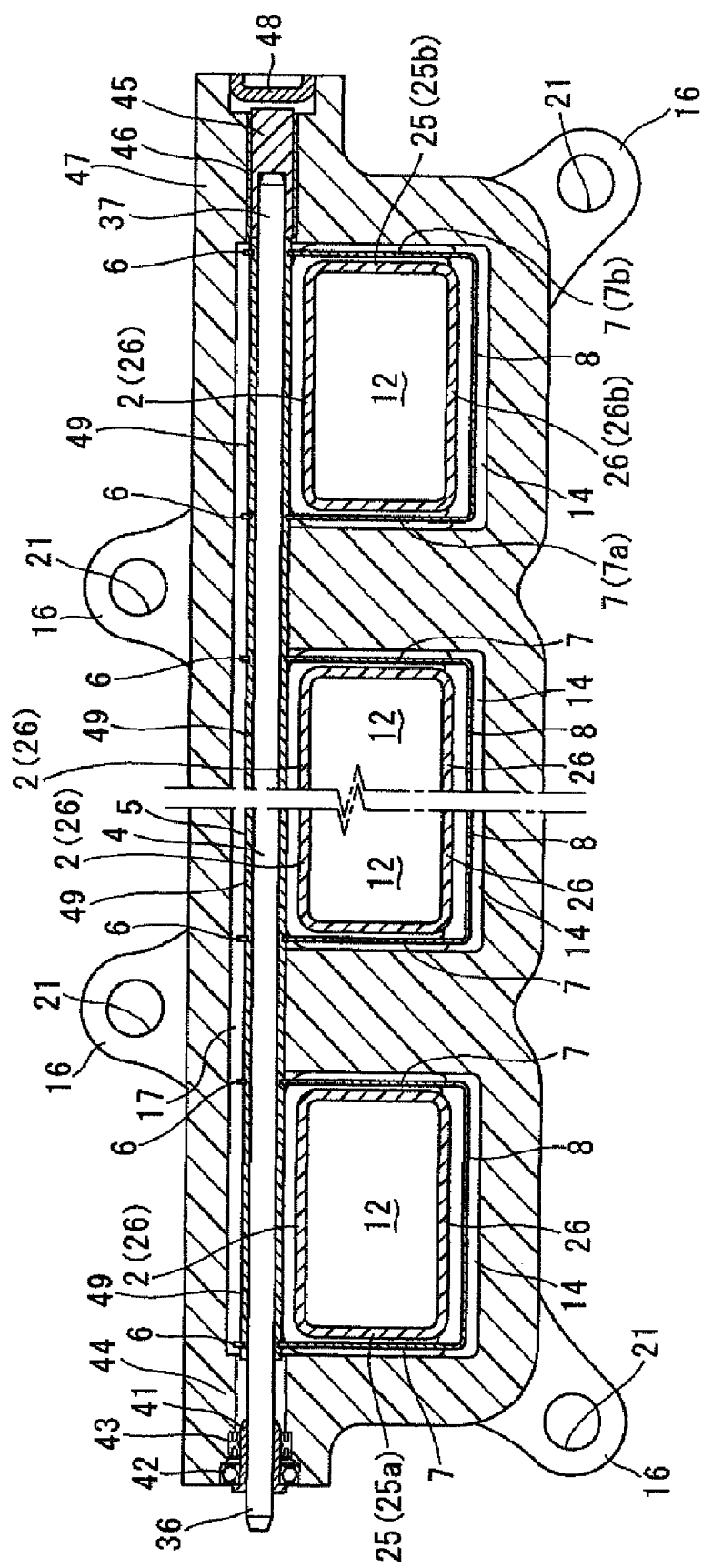
FIG. 5 is a schematic cross sectional view showing a valve unit (the second embodiment), in which a duct is provided inside of the rotary valve.

FIGS. 3 to 5 show a second embodiment of the present invention. FIG. 3 is a front view showing a valve block 1 incorporating a rotary valve 100 according to the second embodiment. FIG. 4A shows the rotary valve 100 accommodated in the valve accommodating space 14. FIG. 4B shows the rotary valve 100 at its valve closed position. FIG. 5 shows the valve unit, in which the air ducts are assembled in the respective inside spaces of the valve block 1.

The valve unit of the present embodiment is composed of the housing (the valve block 1) connected to the cylinder head of the engine, the shaft 5 rotatably supported by the valve block 1, and the swing-type rotary valves (TCV) 100 attached to the shaft 5 at connecting portions 6. The shaft 5 has an outer cylindrical portion made of resin and a metal shaft portion 4 inside of the outer cylindrical portion. The shaft 5 having the metal shaft portion 4 is made by an insert-molding process.

The housing is composed of the valve block 1 made of the resin, the air duct 2 also made of the resin but separately from the valve block 1, and the valve cover 3 made of the resin fixed to the upstream end of the air duct 2.

A shaft accommodating space 17 is formed between an upper wall of the valve block 1 and the upper wall portion 26a of the air duct 2 for accommodating the shaft 5.

As in the same manner to the first embodiment, the duct extending portion 27 is formed at the downstream end of the air duct 2. The duct extending portion 27 has the U-shaped cross section having the small height. The duct extending portion 27 extends in the downward direction from the downstream end of the air duct 2. The duct extending portion 27 has the pair of small side walls extending in the lower direction. The communication passage 28 is likewise formed between the duct extending portion 27 and the forward end of the valve plate 8, when the rotary valve 100 is moved to the valve closed position, as shown in FIG. 4B.

Each of the side wall portions 25 (25a, 25b) of the air duct 2 is formed with the straight portion 32 at its downstream end, as shown in FIG. 4A or 4B. The straight portion 32 is inclined with respect to the plane perpendicular to the intake air flow flowing in the air-intake passages 12 and 13, in such a way that the longitudinal length of the side wall portion at the lower half is smaller than that of at the upper half.

The shaft 5 having the metal shaft portion 4 extends in the shaft accommodating space 17 at the outer side of the upper wall portion 26a of the air duct 2.

The metal shaft portion 4 has a polygonal cross section (for example, a square-shaped cross section) integrally formed with the shaft 5 made of the resin. A left-hand end 36 of the metal shaft portion 4 projects from the resin-made shaft 5 in the left-hand direction, while a right-hand end 37 projects in the right-hand direction, as shown in FIG. 5.

The left-hand end 36 is rotatably supported by a first shaft supporting portion 44, which is composed of a cylindrical shaft joint 41 inserted to the left-hand end 36, a ball bearing 42 and an oil seal member 43. The left-hand end 36 projecting from the housing (the valve block 1) is connected to the actuator (not shown) having the electric motor and the reduction gear device. The multiple rotary valves 100 are driven by the shaft 5 at the same time.

The right-hand end 37 is likewise rotatably supported by a second shaft supporting portion 47, which is composed of a cylindrical metal collar 46 and a bearing member 45 made of the resin. An open end of the valve block 1 at the second shaft supporting portion 47 is closed by a cap member 48.

The shaft 5 is made of the resin and composed of multiple valve holding portions 49, to which the connecting portions 6 of the rotary valve 100 are fixed, so that the multiple rotary valves 100 are driven by the shaft 5 at the same time.

In a similar manner to the first embodiment, each of the rotary valves 100 has the pair of side plates 7 (made of the metal) outwardly extending from the shaft 5 to the free end in the radial direction. The valve plate 8 (made of the metal) is formed at the free ends for connecting the free ends of the side plates 7 (7a, 7b). As shown in FIGS. 4A and 4B, each of the side plates 7 (7a, 7b) has a triangular shape.

As shown in FIG. 4A, the rotary valve 100 is moved to its fully opened position by the actuator (not shown) during the normal operating condition of the engine. In the valve opened condition, the rotary valve 100 (in particular, the valve plate 8) is accommodated in the valve accommodating space 14, so that the air-intake passage 12 is fully opened. The rotary valve 100 may be biased by the spring (not shown) provided in the actuator in the direction to either the valve opening position or the valve closing position.

As shown in FIG. 4B, the rotary valve 100 is moved to its fully closed position by the actuator at starting the engine and during an idling operation of the engine. In the valve closed condition, the rotary valve 100 is moved out of the valve accommodating space 14, so that the air-intake passage 12 is fully closed.

Each of the connecting portions 6 is a part of the side plate 7 (7a, 7b) of the rotary valve 100 and is integrally formed with the valve holding portion 49 by the insert-molding process. A square shaped connecting hole is formed in the connecting portion 6, so that the metal shaft portion 4 (having the square-shaped cross section) is inserted through the square shaped connecting hole. The shaft 5 (the metal shaft portion 4 and the connecting portion 6) is provided at a position which is an upstream side of the air-intake passage 12.

The pair of side plates 7 (7a, 7b) of the rotary valve 100 is made of the metal and opposing to each other in the direction in parallel to the axial direction of the shaft 5. The side plates 7 (7a, 7b) are formed by bending a metal plate for the rotary valve 100 at both side portions for the valve plate 8 toward the shaft 5. When the rotary valve 100 is moved to the valve closed position (FIG. 4B), the side plates 7 (7a, 7b) cover lateral open ends formed at the downstream side of the air duct 2 (that is, the open ends at the gap 9 opening in the lateral direction). The gap 9 is formed between the downstream end of the air-intake passage 12 and the valve plate 8, as in the same manner to the first embodiment.

The valve plate 8 is rotated at the shaft 5 in the forward and backward direction along lower ends of the side wall portions 25 (25a, 25b) of the air duct 2, so that the opening area of the air-intake passage 12 formed in the air duct 2 is controlled by the valve plate 8.

The forward end of the flat surface portion 34 of the valve plate 8 forms the communication passage 28 between the forward end and the duct extending portion 27 (the upper wall portion 26a), when the rotary valve 100 is moved to the valve closed position.

The valve plate 8 has the flat surface portion 34, which faces to the downstream end of the air-intake passage 12 and the straight portions 32 of the side wall portions 25 (25a, 25b) via the gap 9 when the rotary valve 100 is moved to the valve closed position. The flat surface portion 34 is inclined with respect to the plane perpendicular to the intake air flow in such a way that an elongation of the flat surface portion 34 may cross an elongation of the straight portion 32 at an acute angle. Namely, the distance of the gap 9 at the lower area is larger than the distance of the gap 9 at the upper area, as shown in FIG. 4B.

As above, even in the case that the gap 9 between the valve plate 8 and the downstream end of the air duct 2 is designed to be larger, it is possible to suppress a decrease of the function for moving the intake air to the one side of the air-intake passages 12 and 13, that is to the side of the communication passage 28. It is, therefore, possible to generate the stronger tumble flow in the combustion chamber.

In addition, it is possible to increase the gap 9 by more than the predetermined value (for example, 0.1 to 0.3 mm), compared with that for the conventional device. And thereby, it becomes possible to suppress occurrence of the malfunction and/or the valve-lock of the rotary valve, which would be otherwise caused by the deposit amount of the combustion product (such as, combustion soot, adhesive material).

Third Embodiment

Figure 6A:
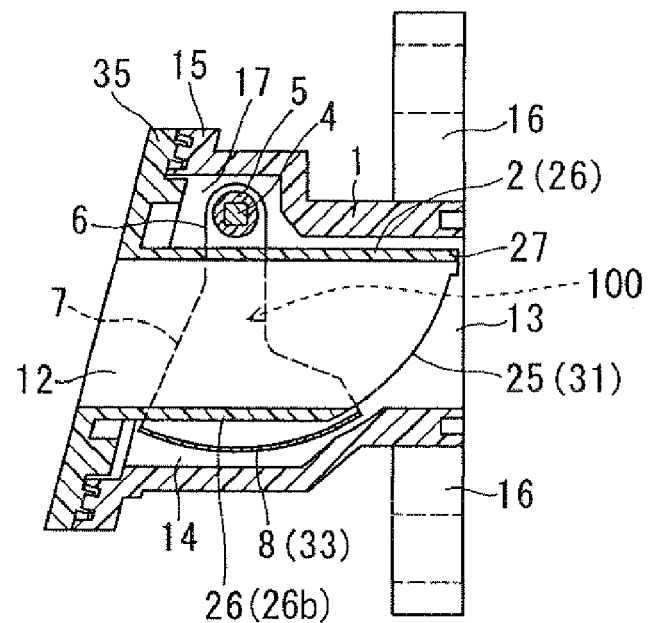
FIGS. 6A and 6B are schematic cross sectional views showing a rotary valve according to a third embodiment of the present invention, corresponding to the cross sectional views of FIGS. 4A and 4B.
Figure 6B:
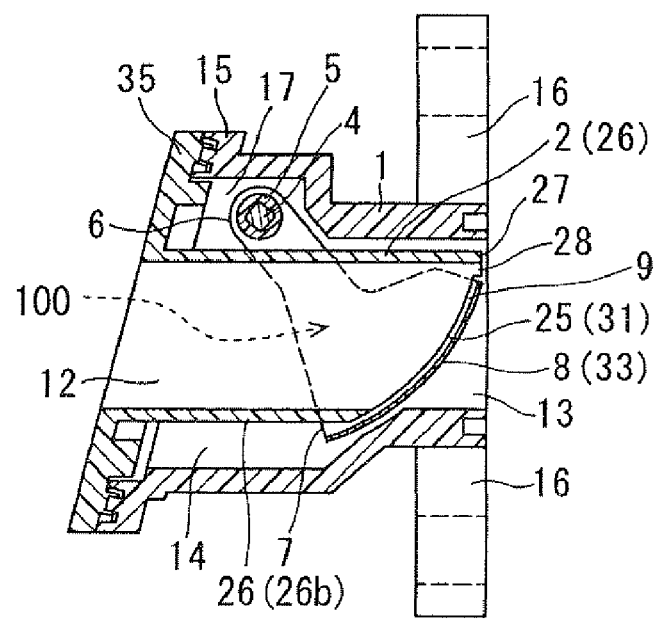

FIGS. 6A and 6B show a third embodiment of the present invention. FIG. 6A shows the rotary valve 100 accommodated in the valve accommodating space 14 (the valve opened condition). FIG. 6B shows the rotary valve 100 in the valve closed condition.

Each of the side wall portions 25 (25a, 25b) of the air duct 2 has the downstream end, which is only formed with the curved portion 31 having the curvature radius at the shaft 5. The curved portion 31 extends from the duct extending portion 27 to the lower wall portion 26b.

Each of the rotary valves 100 has the pair of side plates 7 (made of the metal) outwardly extending from the shaft 5 to the free end in the radial direction. The valve plate 8 (made of the metal) is formed at the free ends for connecting the free ends of the side plates 7. As shown in FIGS. 6A and 6B, each of the side plates 7 has an L-shape.

The valve plate 8 of the rotary valve 100 has the curved surface portion 33, which faces to the downstream end of the air-intake passage 12 and the curved portions 31 of the side wall portions 25 (25a, 25b) via the gap 9 when the rotary valve is moved to the valve closed position. The curved surface portion 33 has the curvature radius at the shaft 5. The curved surface portion 33 has a curved recessed surface corresponding to a curved convex portion of the curved portion 31.

As shown in FIG. 6A, the rotary valve 100 is moved to its valve opened position by the actuator (not shown) during the normal operating condition of the engine. In the valve opened condition, the rotary valve 100 (in particular, the valve plate 8) is accommodated in the valve accommodating space 14, so that the air-intake passage 12 is fully opened. The rotary valve 100 may be biased by the spring (not shown) provided in the actuator in the direction to either the valve opening position or the valve closing position.

As shown in FIG. 6B, the rotary valve 100 is moved to its valve closed position by the actuator at starting the engine and during an idling operation of the engine. In the valve closed condition, the rotary valve 100 is moved out of the valve accommodating space 14, so that the air-intake passage 12 is closed.

A rotational angle of the rotary valve 100 (that is, an opening degree of the rotary valve) is continuously changed and controlled at a desired position within a full valve operating range, that is between the valve fully opened condition and the valve fully closed condition. Namely, the opening area of the air-intake passage 12 is controlled at the desired value in a continuous or a stepwise manner.

As above, the third embodiment has the same effects to the first and second embodiments.

Fourth Embodiment

Figure 7A:
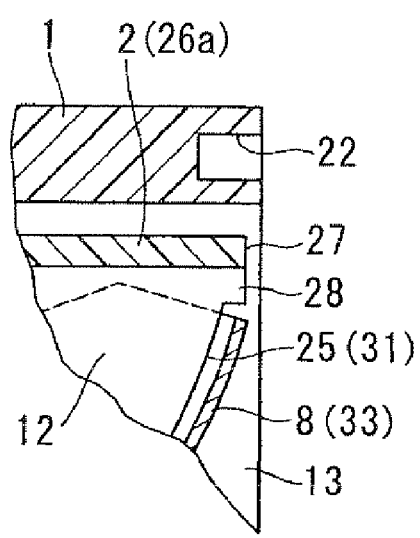
FIGS. 7A and 7B are respectively a schematic cross sectional view and a front view showing a duct extending portion according to a fourth embodiment of the present invention.
Figure 7B:
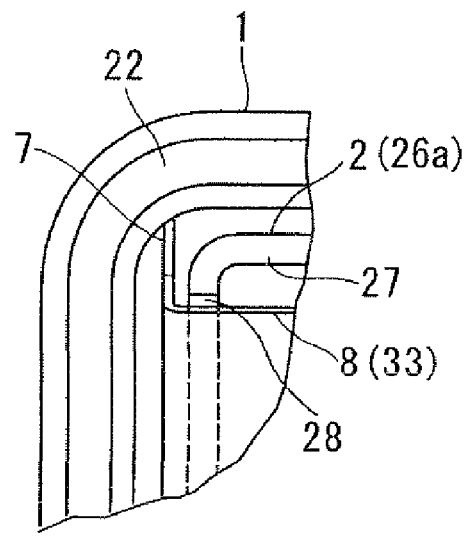
Figure 8A:
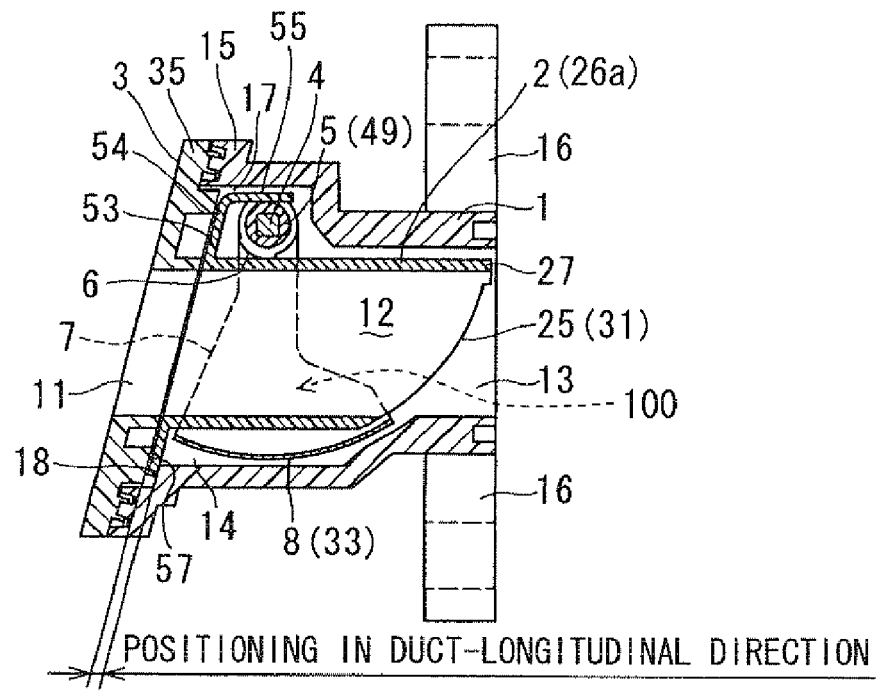
FIGS. 8A and 8B are schematic cross sectional views showing a rotary valve according to the fourth embodiment of the present invention, corresponding to the cross sectional views of FIGS. 4A and 4B.
Figure 8B:
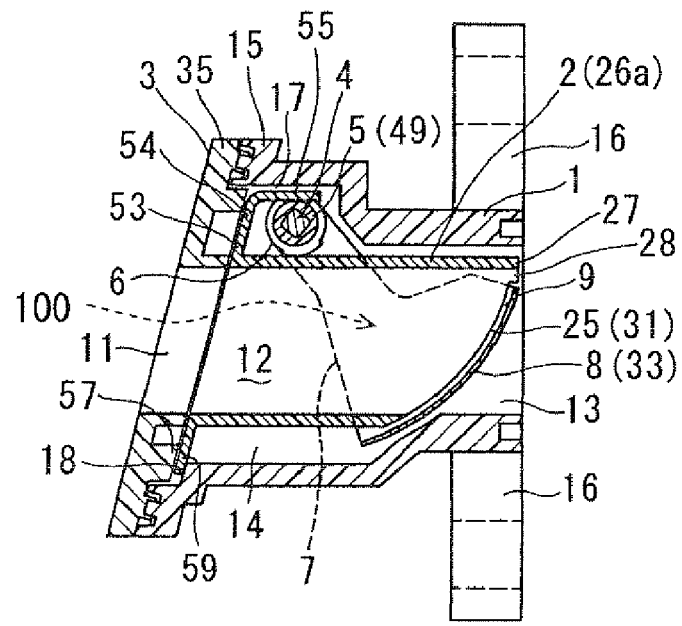
Figure 9:
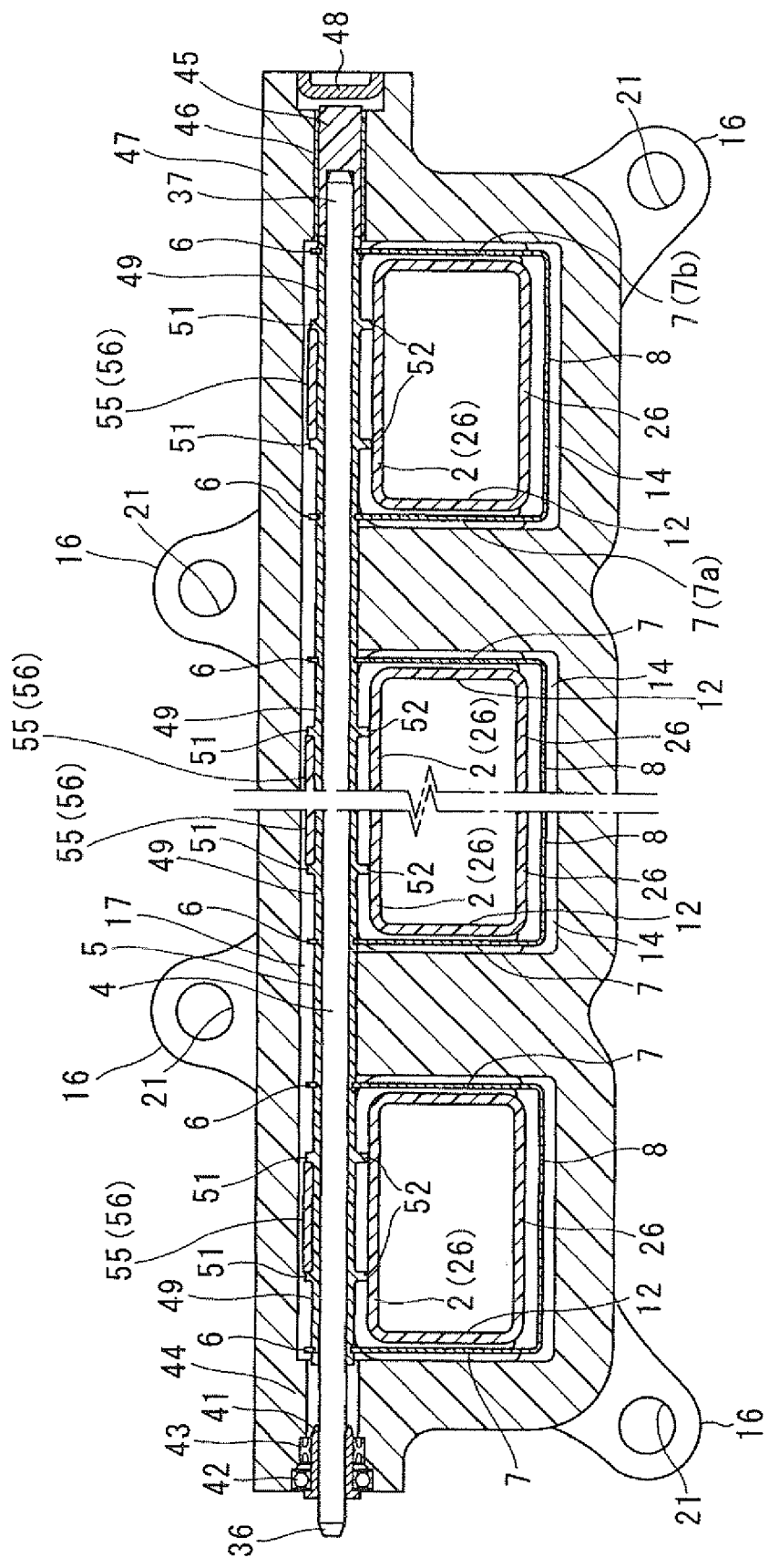
FIG. 9 is a schematic cross sectional view showing a valve unit (the fourth embodiment), in which a duct is provided inside of the rotary valve.
Figure 10:
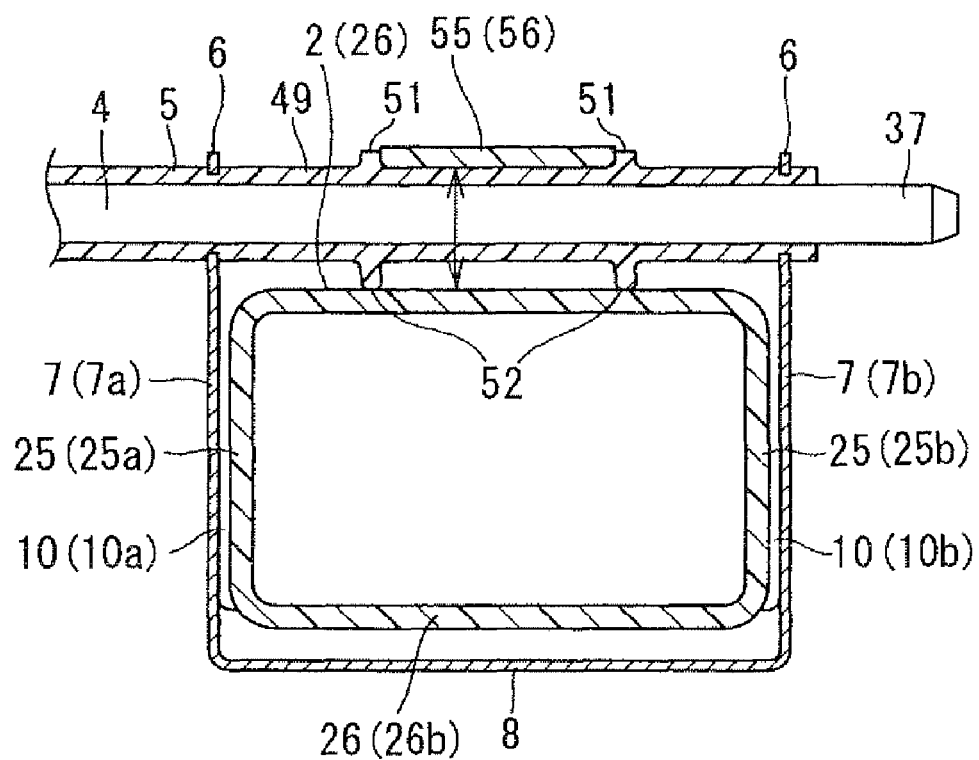
FIG. 10 is a schematic enlarged cross sectional view showing the valve unit, in which an air duct is positioned with respect to a housing in a vertical direction and in a lateral direction.
Figure 11A:
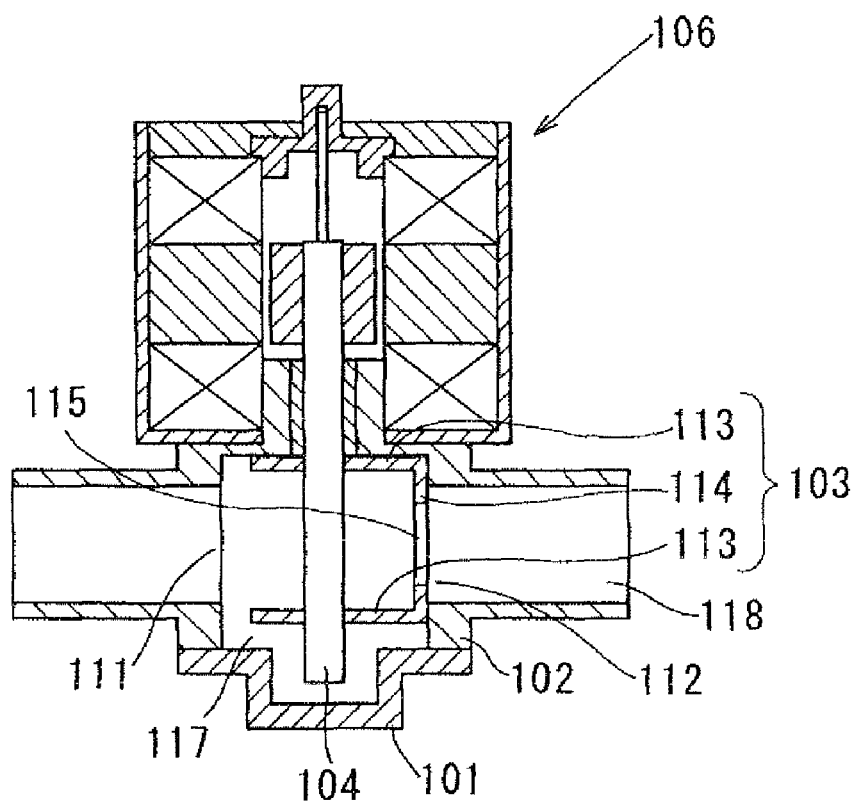
FIGS. 11A and 11B are schematic cross sectional views showing a flow control valve of a prior art.
Figure 11B:
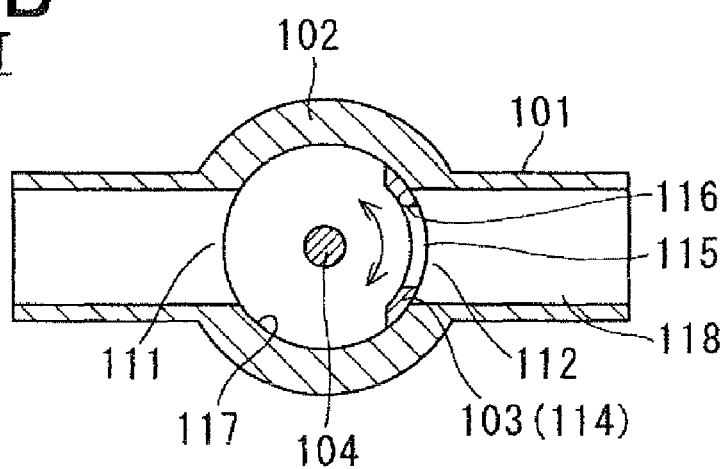

FIGS. 7A to 10 show a fourth embodiment of the present invention. FIG. 7A is an enlarged cross sectional view showing a part of the rotary valve 100 including the duct extending portion 27 and the valve plate 8. FIG. 7B is also an enlarged side view showing the part of the rotary valve 100 corresponding to the part shown in FIG. 7A. FIG. 8A shows the rotary valve 100 accommodated in the valve accommodating space 14. FIG. 8B shows the rotary valve 100 at its valve closed position. FIG. 9 shows the valve unit, in which the air ducts are assembled in the respective inside spaces of the valve block 1. FIG. 10 is a cross sectional view showing the air duct 2 positioned with respect to the shaft 5.

The shaft 5 made of the resin has the multiple valve holding portions 49, to which the connecting portions 6 of the respective rotary valves 100 are fixed, for example, by the insert-molding process. Each of the valve holding portions 49 has a pair of collar portions 51 outwardly projecting in a radial direction from the outer periphery thereof. The pair of collar portions 51 is formed at a distance from each other in the axial direction of the shaft 5. A lower portion of each collar portion 51 forms a sliding portion 52, which slides on an outer surface of the upper wall portion 26a of the air duct 2.

The air duct 2 has a flanged portion 53 formed at the upstream end thereof and an L-shaped arm portion (54, 55) outwardly extending from the flanged portion 53. A first arm portion 54 of the L-shaped arm portion extends outwardly and upwardly from an upper peripheral portion of the flanged portion 53. A second arm portion 55 of the L-shaped arm portion extends laterally and backwardly from the first arm portion 54. A forward end 56 of the second arm portion 55 is inserted into a space between the pair of the collar portions 51, as shown in FIG. 10.

Since the second arm portion 55 is arranged between the collar portions 51 of the shaft 5, the air duct 2 is positioned to its place with respect to the valve block 1 in the axial direction of the shaft 5 (the lateral direction of the air duct 2).

As a result, the side gaps 10a and 10b respectively formed between the side plates 7 (7a and 7b) and the side wall portions 25 (25a and 25b) are made to be equal to each other.

The housing is composed of the valve block 1, the air duct 2 and the valve cover 3, all of which are made of resin and formed as separate parts.

The flanged portion 15 is integrally formed with the valve block 1 at the upstream side thereof and a step portion 18 is formed at an inner peripheral portion of the flanged portion 15.

As in the same manner to the second and third embodiments, the shaft accommodating space 17 is formed between the valve block 1 and the upper wall portion 26a of the air duct 2 for accommodating the shaft 5.

Each of the air ducts 2 is movably attached to the valve block 1, so that relative movement of the air duct 2 to the valve block 1 is possible, before the air duct 2 is assembled to the valve block 1.

As shown in FIGS. 7A and 7B, the duct extending portion 27 of the window-roof shape is formed at the downstream end of the upper wall portion 26a of the air duct 2.

The shaft 5 (including the metal shaft portion 4) is rotatably supported by the shaft supporting portions 44 and 47 of the valve block 1. In other words, the shaft 5 is positioned to its place not only in the lateral direction (the axial direction of the shaft 5) but also in a vertical direction of the valve block 1.

As explained above, the forward end of the second arm portion 55 is located between the pair of the collar portions 51 of the shaft 5 (FIG. 10), and the second arm portion 55 and the upper wall portion 26a of the air duct 2 clip the shaft 5, as shown in FIGS. 8A and 8B. In other words, the second arm portion 55 and the upper wall portion 26a form a U-shaped shaft clipping portion. And the second arm portion 55 and the upper wall portion 26a position the air duct 2 with respect to the valve block 1 in the vertical direction thereof.

As explained above, the valve cover 3 is formed as the separate part from the valve block 1 and the air duct 2. An opening 11 is provided in the valve cover 3 to form a part of the air-intake passage 12.

The valve cover 3 has a duct holding portion 57, which projects in a downstream direction of the air-intake passage 12 and faces to the step portion 18 of the valve block 1 so that the flanged portion 53 of the air duct 2 is interposed between the step portion 18 and the duct holding portion 57, except for the shaft accommodating space 17, as shown in FIGS. 8A and 8B. In other words, the step portion 18 as well as the duct holding portion 57 positions the air duct 2 to its place in a longitudinal direction of the air duct 2.

According to the fourth embodiment, the air duct 2 is made of the resin. However, the air duct 2 may be made of a metal material. As shown in FIG. 8B, a blade spring 59 may be provided between the duct holding portion 57 and the flanged portion 53, so that the flanged portion 53 of the air duct 2 is more strongly pushed to the step portion 18 of the valve block 1.

Modifications

According to the above embodiments, the air intake device is applied to the engine to generate the vertical swirl (the tumble flow) of the air-fuel mixture in the combustion chambers, so as to improve the combustion therein. The invention may be applied to the engine to generate lateral flow (lateral swirl flow) of the intake air in the combustion chambers. Furthermore, the invention may be applied to the engine to generate squish flow (squish swirl flow) of the intake air in the combustion chambers.

The air intake device of the invention may be further applied to an electronic throttle device, a variable intake apparatus in which a length and/or a cross sectional area of the air-intake passage is changed.

According to the above embodiments, the actuator is composed of the electric motor and the power transmitting device (such as, the reduction gear). The actuator may be composed of a negative pressure type actuator having an electromagnetic or an electric negative pressure valve.

The present invention may be further applied to a throttle valve provided in a throttle body (a control valve for intake air amount), or applied to a control valve provided in the air-intake passage for controlling an idling engine speed (that is, a control valve for intake air bypassing the throttle valve).

Furthermore, the present invention may be applied to an ON-OFF valve for opening or closing the intake passage, a switching valve for switching an air-intake passage to another air-intake passage, a control valve for controlling intake pressure, and so on.

The invention may be applied to a diesel engine, or an engine having one cylinder.

What is claimed is:

1. An air intake device for an engine comprising:
   (a) a housing, in which an air-intake passage connected to an intake port of the engine is formed;
   (b) a shaft rotatably supported by the housing; and
   (c) a U-shaped rotary valve having connecting portions connected to the shaft and reciprocating in a rotational direction for changing an opening area of the air-intake passage,
   wherein the housing has an air duct, which surrounds an outer periphery of the air-intake passage and extends from an upstream side to a downstream side of intake air flow so that the air duct passes through an inside space defined by the U-shaped rotary valve,
   wherein the rotary valve has a pair of side plates extending outwardly from the connecting portions in a radial direction of the shaft, so that the side plates are separated from each other at an axial distance in parallel to the shaft and opposed to each other in an axial direction of the shaft, wherein the rotary valve further has a valve plate connected to each free end of the side plates, which is on an opposite side to the connecting portion, wherein the valve plate faces to a downstream end of the air duct via a gap between the valve plate and the air duct, when the rotary valve is moved to its valve closed position, and wherein the side plates cover opened areas of the gap in a lateral direction in parallel to the axial direction of the shaft, when the rotary valve is in its valve closed position.

2. The air intake device according to claim 1, wherein the rotary valve moves at an outer side of the air duct, and the valve plate of the rotary valve rotates at the shaft along downstream ends of side wall portions of the air duct.

3. The air intake device according to claim 1, wherein the air duct is provided in the housing to form a valve accommodating space between a wall portion of the air duct and the housing, and the valve plate as well as the side plates of the rotary valve are accommodated in the valve accommodating space when the rotary valve is moved to its valve opened position.

4. The air intake device according to claim 1, wherein the valve plate of the rotary valve has a flat surface portion, which is inclined in a downstream direction with respect to a plane perpendicular to the intake air flow, when the rotary valve is moved to the valve closed position.

5. The air intake device according to claim 1, wherein a downstream end of the side wall portions of the air duct is formed in a curved shape having a curvature radius at the shaft, and the valve plate of the rotary valve has a curved surface portion corresponding to the curved shape of the downstream end of the side wall portions.

6. The air intake device according to claim 1, wherein the air-intake passage has an air outlet portion opening at the downstream end of the air duct, and a communication passage, which communicates the air outlet portion of the air-intake passage to the intake port of the engine, is formed between the rotary valve and the downstream end of the air duct, when the rotary valve is moved to its valve closed position.

7. The air intake device according to claim 1, wherein the opened areas of the gap open at both side ends in a direction parallel to the shaft.

8. The air intake device according to claim 1, wherein the shaft is arranged so as to outwardly extend from an outer side surface of the air duct.

9. The air intake device according to claims 1, wherein the shaft is made of resin, and the connecting portions are made of metal and integrally formed with the shaft by an insert-molding process.

10. The air intake device according to claim 1, wherein the air duct is made as a separate part from the housing, and the air duct is movable relative to the housing when the air duct is assembled to the housing.

11. The air intake device according to claim 10, wherein the air duct has an L-shaped arm portion formed at an upstream end of the air duct, the L-shaped arm portion has a first arm portion outwardly extending from the upstream end of the air duct, and the L-shaped arm portion has a second arm portion extending from the first arm portion in a downstream direction of the intake air flow.

12. The air intake device according to claim 11, wherein the shaft is arranged between the L-shaped arm portion and an outer surface of the air duct, so that the air duct is positioned with respect to the housing.

13. The air intake device according to claim 11, wherein the shaft has a pair of collar portions outwardly projecting in a radial direction of the shaft from an outer periphery thereof, the pair of collar portions being separated at a distance from each other in the axial direction of the shaft, the L-shaped arm portion has a forward end inserted into a space defined by the pair of the collar portions, and the air duct is positioned with respect to the housing when the forward end of the L-shaped arm portion is inserted into the space.

14. The air intake device according to claim 10, wherein the air duct has a flanged portion formed at the upstream side of the air duct and outwardly extending from an outer periphery of the upstream side of the air duct in a direction almost perpendicular to a longitudinal direction of the air duct, the housing is composed of a valve block and a valve cover, each of which is made as separated member from the air duct, the valve block is arranged so as to surround a periphery of the air duct and separate an inside of the housing from an outside thereof, the valve cover is made as a separated member from the valve block, the valve cover has a step portion so that the flanged portion of the air duct is interposed between the step portion of the valve block and the valve cover.

15. The air intake device according to claim 1, wherein the housing has a duct extending portion formed at the downstream side of the air duct, wherein the duct extending portion extends in a direction to the downstream side of the intake air flow.

\* \* \* \* \*